United States Patent vor der Brück et al.

[11] 4,324,722
[45] Apr. 13, 1982

[54] WATER-SOLUBLE SUBSTITUTED AMINOCARBONYL MONOAZO DYESTUFFS

[75] Inventors: Dieter vor der Brück, Bonn; Gerhard Wolfrum, Leverkusen, both of Fed. Rep. of Germany

[73] Assignee: Bayer Aktiengesellschaft, Leverkusen, Fed. Rep. of Germany

[21] Appl. No.: 186,375

[22] Filed: Sep. 12, 1980

Related U.S. Application Data

[63] Continuation of Ser. No. 51,660, Jun. 25, 1979, abandoned, which is a continuation of Ser. No. 940,669, Sep. 8, 1978, abandoned.

[30] Foreign Application Priority Data

Sep. 10, 1977 [DE] Fed. Rep. of Germany ....... 2740846

[51] Int. Cl.³ .................... C07C 107/06; C09B 29/18
[52] U.S. Cl. .................... 260/207; 260/207.1
[58] Field of Search ............. 260/207, 207.1

[56] References Cited

U.S. PATENT DOCUMENTS

| | | | |
|---|---|---|---|
| 2,275,013 | 3/1942 | Graenacher et al. | 260/207.1 X |
| 2,373,700 | 4/1945 | McNally et al. | 260/207 X |
| 3,657,220 | 4/1972 | Kilmurry | 260/207 |
| 3,852,263 | 12/1974 | Siegel | 260/207.1 X |
| 3,987,026 | 10/1976 | Koller et al. | 260/207 X |
| 4,020,053 | 4/1977 | Huffman | 260/207 |
| 4,035,350 | 7/1977 | Landler et al. | 260/207 X |
| 4,048,154 | 9/1977 | Westphal | 260/207 X |
| 4,187,218 | 2/1980 | Merlo et al. | 260/207.1 X |

*Primary Examiner*—Paul F. Shaver
*Attorney, Agent, or Firm*—Sprung, Felfe, Horn, Lynch & Kramer

[57] ABSTRACT

Water-soluble monoazo dyestuffs are described, which, in the form of the free acid, correspond to the formula

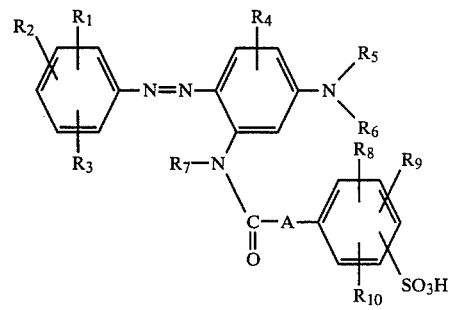

wherein $R_1$, $R_2$, $R_3$, $R_4$, $R_5$, $R_6$, $R_7$, $R_8$, $R_9$, $R_{10}$ and A have the meaning indicated in the description, and their preparation and suitability for dyeing natural and synthetic fibre materials, in particular for dyeing polyamide fibres.

2 Claims, No Drawings

WATER-SOLUBLE SUBSTITUTED AMINOCARBONYL MONOAZO DYESTUFFS

This is a continuation of application Ser. No. 51,660 filed June 25, 1979, now abandoned, which is a continuation of Ser. No. 940,669, filed Sept. 8, 1978, now abandoned.

The invention relates to water-soluble monoazo dyestuffs which, in the form of the free acid, correspond to the formula

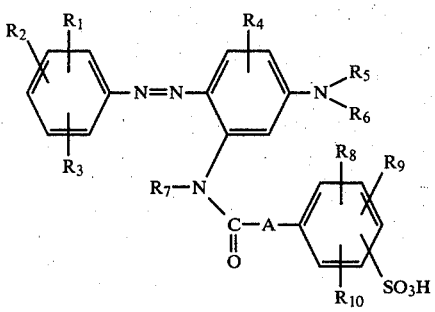

wherein
$R_1$ and $R_2$ denote hydrogen, halogen, phenoxy, $C_1$–$C_4$-alkoxy, $C_1$–$C_4$-alkyl, thiocyano, trifluoromethyl, phenylsulphonyl, $C_1$–$C_{12}$-alkylsulphonyl as well as carbamoyl or sulphamoyl, it being possible for the carbamoyl and sulphamoyl groups to be monosubstituted or disubstituted by $C_1$–$C_{12}$-alkyl which is optionally substituted by $C_1$–$C_4$-alkoxy, cyclohexyl, chlorine, hydroxyl, cyano or phenyl, cyclohexyl, cyclopentyl or phenyl which is optionally substituted by $C_1$–$C_4$-alkyl, cyclohexyl, $C_1$–$C_4$-alkoxy, chlorine, bromine or cyano, $R_3$ denotes hydrogen, chlorine or bromine, $R_4$ denotes hydrogen, $C_1$–$C_4$-alkyl, halogen or $C_1$–$C_4$-alkoxy, $R_5$ and $R_6$ denote hydrogen, optionally substituted alkyl or optionally substituted aralkyl, $R_7$ denotes hydrogen or $C_1$–$C_4$-alkyl, $R_8$, $R_9$ and $R_{10}$ denote hydrogen, $C_1$–$C_4$-alkyl, halogen, $C_1$–$C_4$-alkoxy or cyano and A denotes a bridge member or a direct bond.

Suitable alkyl radicals $R_5$ and $R_6$ are, in particular, $C_1$–$C_4$-alkyl radicals which can be substituted by halogen, cyano, $C_1$–$C_4$-alkoxy, hydroxyl, $C_1$–$C_4$-alkoxycarbonyloxy, $C_1$–$C_4$-alkylcarbonyloxy, $C_1$–$C_4$-alkylcarbonylamino or phenylcarbonylamino.

Suitable aralkyl radicals $R_5$ and $R_6$ are, in particular, benzyl and 2-phenethyl, it being possible for the phenyl radical of these groups to be optionally further substituted by $C_1$–$C_4$-alkyl, $C_1$–$C_4$-alkoxy, halogen or cyano.

Examples of suitable bridge members A and $C_1$–$C_4$-alkylene, $C_1$–$C_4$-alkyleneoxy, oxy-$C_1$–$C_4$-alkylene, oxy-$C_2$–$C_4$-alkyleneoxy, $C_1$–$C_4$-alkylenecarbonyl, $C_1$–$C_4$-alkylenecarbonyloxy, $C_1$–$C_4$-alkyleneoxycarbonyl, $C_1$–$C_4$-alkyleneoxycarbonylamino, —O—, —NH— and amino-$C_1$–$C_4$-alkylene.

Preferred dyestuffs are those which, in the form of the free acid, correspond to the formula

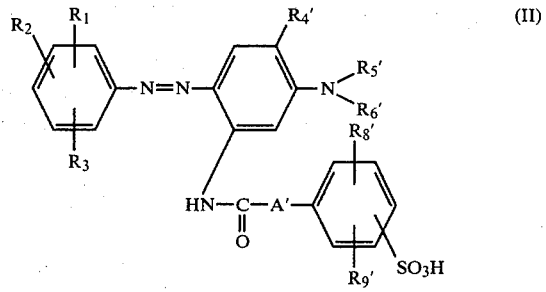

wherein
$R_1$, $R_2$ and $R_3$ have the abovementioned meaning,
$R_4'$ denotes hydrogen, methyl, methoxy or ethoxy,
$R_5'$ and $R_6'$ denote $C_1$–$C_4$-alkyl, which can be further substituted by $C_1$–$C_4$-alkoxy, chlorine, cyano, hydroxyl, $C_1$–$C_4$-alkoxycarbonyloxy, $C_1$–$C_4$-alkylcarbonyloxy, $C_1$–$C_4$-alkylaminocarbonyloxy or phenylaminocarbonyloxy, or phenethyl or benzyl,
$R_8'$ and $R_9'$ denote hydrogen, chlorine, methyl, ethyl, methoxy, ethoxy, trifluoromethyl or cyano and
$A'$ denotes a direct bond, methylene, ethylene, methyleneoxy, ethyleneoxy, methyleneoxycarbonyl, ethyleneoxycarbonyl, propyleneoxycarbonyl, methyleneoxycarbonylamino, ethyleneoxycarbonylamino, oxyethyleneoxy, oxyisopropyleneoxy, oxyisobutyleneoxy, —O—, —NH—, aminomethylene or aminoethylene.

Particularly preferred dyestuffs are those which, in the form of the free acid, correspond to the formula

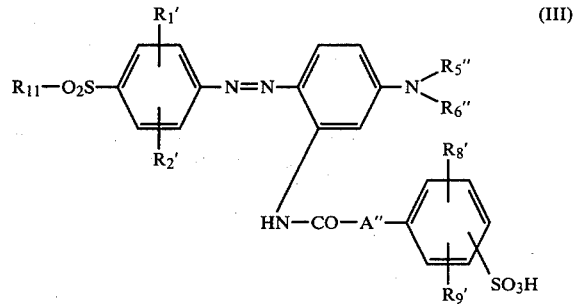

wherein
$R_8'$ and $R_9'$ have the abovementioned meaning,
$A''$ denotes a direct bond, NH, $CH_2$—O, $CH_2$ or $C_2H_4$,
$R_1'$ denotes hydrogen, chlorine, bromine or trifluoromethyl,
$R_2'$ denotes hydrogen or chlorine,
$R_5''$ denotes methyl or ethyl,
$R_6''$ denotes methyl, ethyl or cyanoethyl, and
$R_{11}$ denotes benzyl, phenyl which is optionally substituted by chlorine or methyl, or a radical of the formula

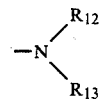

$R_{12}$ denotes hydrogen or $C_1$–$C_4$-alkyl and
$R_{13}$ denotes $C_1$–$C_{12}$-alkyl, $C_1$–$C_4$-alkoxy-$C_1$–$C_4$-alkyl, phenyl which is optionally substituted by methyl, ethyl, chlorine, methoxy or ethoxy, or benzyl, phenethyl, cyclohexyl or methylcyclohexyl.

Within the dyestuffs of the formula (III), the dyestuffs which, in the form of the free acid, correspond to the formula

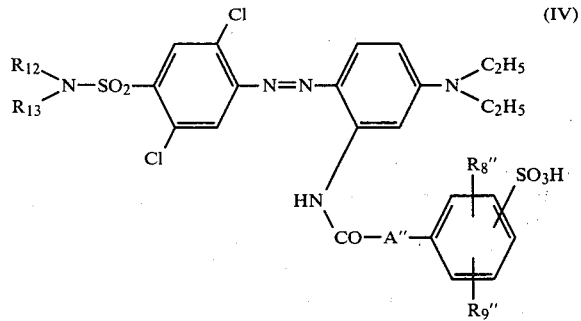

wherein
A'', $R_{12}$ and $R_{13}$ have the abovementioned meaning,
$R_8''$ denotes hydrogen, chlorine, methoxy, ethoxy or methyl and
$R_9''$ denotes hydrogen, chlorine or methyl are preferred.

The dyestuffs of the formula (I) are prepared by diazotising an amine of the formula

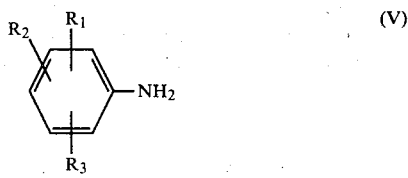

wherein
$R_1$, $R_2$ and $R_3$ have the abovementioned meaning, and coupling the diazotisation product to coupling components of the formula

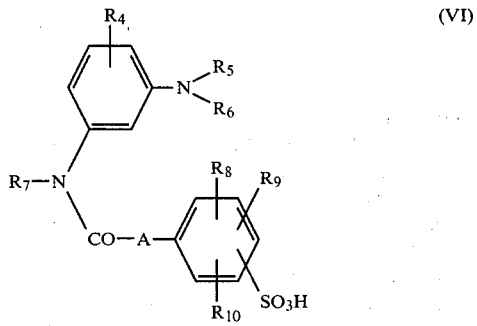

wherein
$R_4$, $R_5$, $R_6$, $R_7$, $R_8$, $R_9$, $R_{10}$ and A have the meaning indicated above.

The dyestuffs according to the invention are suitable for dyeing natural and synthetic fibre materials, in particular for dyeing polyamide fibres in level, deep yellowish-tinged to bluish-tinged red shades of very good fastness to light. They are already absorbed well onto polyamide fibres in a neutral to weakly acid dyebath. By polyamide fibres there are understood here, in particular, those made of synthetic polyamides, such as ε-polycaprolactam or condensation products of adipic acid and hexamethylenediamine. The dyestuffs are used either in the form of the free acids or in the form of their salts, in particular the alkali metal salts, preferably the sodium salts or potassium salts, as well as the ammonium salts.

EXAMPLE 1

2.4 g of 4-(N-methyl-N-cyclohexylaminosulphonyl)-2,5-dichloroaniline are dissolved in 100 ml of glacial acetic acid. 30 ml of concentrated HCl are added and the amine is diazotised at 0° C. with 5 ml of a 10% strength NaNO₂ solution. 2.7 g of 3-(4-methoxy-3-sulphobenzoyl-amino)-N,N-diethylaniline are dissolved in 50 ml of 1 N NaOH. The alkaline solution of the coupling component is added to the diazonium salt solution at 0° C. and the pH is adjusted to about 4 with sodium acetate solution. The dyestuff of the formula

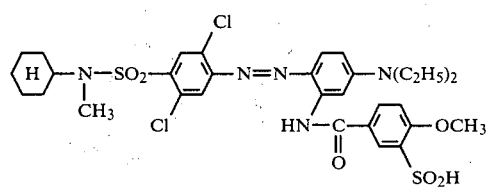

which has precipitated is filtered off and dried at 40° C.
The coupling component of the formula

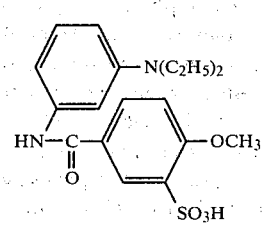

was prepared by reacting p-methoxybenzoyl chloride with 3-N,N-diethylamino-aniline in toluene in the presence of NaHCO₃ and after-sulphonating the product at 60° C. in 100% strength sulphuric acid with 20% of oleum.

DYEING EXAMPLE 1

0.1 g of the dyestuff from Example 1 is dissolved hot in 100 ml of water, 5 ml of 10% strength ammonium acetate solution are added and the mixture is diluted to a volume of 500 ml of with water. 10 g of polyamide fibres are introduced into the dyebath, the dyebath is brought to the boil in the course of 20 minutes, 4 ml of 10% strength acetic acid are added and the bath is boiled for one hour. Thereafter, the fibres are rinsed and dried at 70° to 80° C. A dyeing in a bluish-tinged red shade with good fastness properties in use, in particular with very good fastness to wet processing, is obtained.

EXAMPLE 2

2.4 g of 4-(N-methyl-N-cyclohexylaminosulphonyl)-2,5-dichloroaniline are dissolved and diazotised analogously to Example 1. 3.3 g of 3-(4-sulpho-2-chlorophenoxy-acetylamino)-N,N-diethylaniline are dissolved in 60 ml of half-concentrated acetic acid and the solution is added to the diazonium salt solution. The pH is adjusted to about 4 with sodium acetate solution.

The dyestuff of the formula

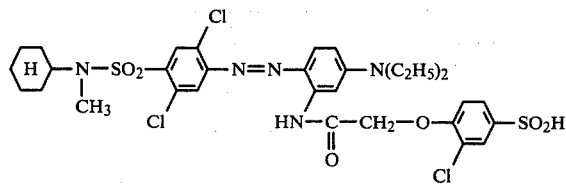

which has precipitated is filtered off and dried at 40° C. The dyestuff dyes polyamide fabric in a bluish-tinged red shade with good fastness properties in use, in particular with very good fastness to wet processing.

The acid coupling component was prepared from the compound of the formula

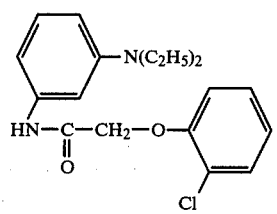

which has been prepared by customary processes, by after-sulphonation at 100° C. in sulphuric acid monohydrate.

If the procedure is as in Example 1 and 2, using the corresponding diazo and coupling components, further dyestuffs of the general formula VII which follows having the substituent meanings and colour shades indicated in the table which follows are obtained. The dyestuffs are water-soluble, dye polyamide in orange to ruby-red shades from a weakly acid or neutral bath and, in particular, are very fast to wet processing. The dyestuffs are furthermore distinguished by the fact that they are not sensitive to hard water.

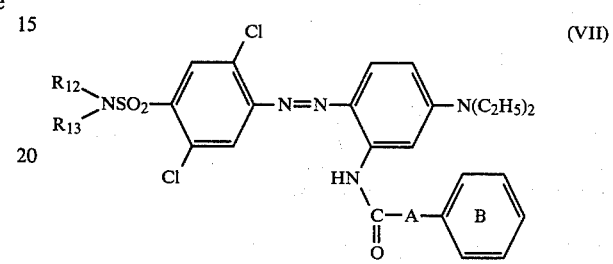

"x-sulpho" in the table means that the precise position of the sulpho group in ring B is unknown.

TABLE 1

| Example | $R_{12}$ | $R_{13}$ | A | Substituents on B | Colour shade |
|---|---|---|---|---|---|
| 3 | phenyl | methyl | —CH$_2$—O— | 2-chloro-4-sulpho | bluish-tinged red |
| 4 | benzyl | H | " | " | " |
| 5 | phenethyl | H | " | " | " |
| 6 | o-tolyl | H | " | " | " |
| 7 | p-ethylphenyl | H | " | " | " |
| 8 | 3-chloro-4-methylphenyl | H | " | " | " |
| 9 | 2-methoxyphenyl | H | " | " | " |
| 10 | 2-methoxy-5-chlorophenyl | H | " | " | " |
| 11 | 2-methylcyclohexyl | H | " | " | " |
| 12 | butyl | butyl | " | " | " |
| 13 | butyl | butyl | " | 4-sulpho | " |
| 14 | butyl | butyl | " | 2-methyl-4-chloro-6-sulpho | " |
| 15 | butyl | butyl | " | 2,4-dichloro-6-sulpho | " |
| 16 | butyl | butyl | " | 2-methyl-4-sulpho-5-sulpho | " |
| 17 | cyclohexyl | methyl | " | 2-methyl-4-chloro-6-sulpho | " |
| 18 | 2-methylcyclohexyl | methyl | " | 3-sulpho-4-methoxy | " |
| 19 | phenyl | methyl | " | " | " |
| 20 | 4-biphenylyl | methyl | " | " | " |
| 21 | butyl | butyl | " | " | " |
| 22 | ethyl | ethyl | " | " | " |
| 23 | butyl | H | " | " | " |
| 24 | butoxybutyl | H | " | " | " |
| 25 | butoxybutyl | H | " | 3-methoxy-x-sulpho | " |
| 26 | methyl | methyl | " | " | " |
| 27 | phenethyl | H | " | 3-sulpho-4-methoxy | " |
| 28 | benzyl | benzyl | " | " | " |
| 29 | cyclohexylmethyl | H | —NH— | 4-sulpho | " |
| 30 | cyclohexyl | methyl | " | " | " |
| 31 | butyl | butyl | " | " | " |
| 32 | phenyl | ethyl | " | " | " |
| 33 | phenyl | methyl | " | " | " |
| 34 | phenethyl | H | " | " | " |
| 35 | 4-ethylphenyl | H | " | " | " |
| 36 | 2,5-dimethylphenyl | H | " | " | " |
| 37 | 2-ethoxyphenyl | H | " | " | " |
| 38 | cyclohexyl | methyl | " | 2-sulpho-4-methyl | " |
| 39 | hexyl | H | " | 2-sulpho-4-chloro | " |
| 40 | octyl | methyl | " | x-sulpho-4-ethoxy | " |
| 41 | 4-cyclohexyl-2-methylphenyl | H | " | 2-sulpho-4-methyl | " |
| 42 | phenyl | H | — | 2-sulpho | yellowish-tinged red |
| 43 | phenylethyl | H | CH$_2$ | x-sulpho-4-methyl | red |
| 44 | benzyl | methyl | " | " | " |
| 45 | cyclohexyl | H | " | " | " |
| 46 | 2-methylphenyl | H | CH$_2$—CH$_2$ | x-sulpho | " |
| 47 | 4-chlorobenzyl | H | " | " | " |
| 48 | phenylethyl | methyl | " | x-sulpho-4-methyl | bluish-tinged red |

TABLE 1-continued

| Example | R$_{12}$ | R$_{13}$ | A | Substituents on B | Colour shade |
|---|---|---|---|---|---|
| 49 | 2,5-diethoxyphenyl | H | " | 2-chloro-5-methyl-x-sulpho | " |
| 50 | cyclohexylethyl | H | " | " | yellowish-tinged red |
| 51 | 2-methyl-4-cyclohexylphenyl | H | " | " | yellowish-tinged red |
| 52 | octyl | methyl | —NH— | 2,5-dichloro-4-sulpho | bluish-tinged red |
| 53 | benzyl | ethyl | " | 2-chloro-4-sulpho-5-methyl | " |
| 54 | phenylethyl | H | O | x-sulpho | red |
| 55 | phenylethyl | H | —CH$_2$O— | 2-methyl-3,5-dichloro-4-sulpho | bluish-tinged red |
| 56 | phenylethyl | H | OC$_2$H$_4$O | 4-sulpho | " |
| 57 | 2-cyanoethyl | H | NH—CH$_2$ | x-sulpho | " |
| 58 | 2-methoxyethyl | H | N—C$_2$H$_4$ | " | " |
| 59 | 2-methoxyethyl | H | C$_2$H$_4$OCONH | " | red |
| 60 | propyl | H | C$_2$H$_4$OCO | 2-sulpho | " |
| 61 | butyl | methyl | " | " | " |

Further dyestuffs for polyamide are prepared by diazotisation and coupling in the customary manner, using the diazo components and coupling components given in Table 2, which follows.

TABLE 2

| Example | Diazo component | Coupling component | Colour shade |
|---|---|---|---|
| 62 | 2-trifluoromethyl-4-hexylaminosulphonyl-5-chloroaniline | N,N-diethyl-3-(2-sulpho-4-chlorophenyl)-aminocarbonylaminoaniline | bluish-tinged red |
| 63 | 2-trifluoromethyl-4-hexylaminosulphonylaniline | N,N-diethyl-3-(3-chloro-4-sulphophenyl)-aminocarbonylaminoaniline | yellowish-tinged red |
| 64 | 2-trifluoromethyl-4-hexylaminosulphonylaniline | N,N-diethyl-3-(x-sulpho-4-ethoxyphenyl)-aminocarbonylaminoaniline | " |
| 65 | 2,5-dichloro-4-phenylsulphonylaniline | N,N-diethyl-3-(x-sulpho-4-ethoxyphenyl)-aminocarbonylaminoaniline | bluish-tinged red |
| 66 | 2,5-dichloro-4-(4-methylphenyl)-sulphonylaniline | N,N-diethyl-3-(x-sulpho-4-ethoxyphenyl)-aminocarbonylaminoaniline | " |
| 67 | 2-phenylsulphonyl-4-bromoaniline | N,N-diethyl-3-(x-sulpho-4-ethoxyphenyl)-aminocarbonylaminoaniline | red |
| 68 | 2-phenylsulphonyl-5-trifluoromethylaniline | N,N-diethyl-3-(x-sulpho-4-ethoxyphenyl)-aminocarbonylaminoaniline | yellowish-tinged red |
| 69 | 2-phenylsulphonyl-5-phenylaminocarbonylaniline | N,N-diethyl-3-(x-sulpho-4-ethoxyphenyl)-aminocarbonylaminoaniline | " |
| 70 | 2-phenylsulphonyl-5-dimethylaminosulphonylaniline | N,N-diethyl-3-(x-sulpho-4-ethoxyphenyl)-aminocarbonylaminoaniline | " |
| 71 | 2-phenylsulphonylaniline | N,N-diethyl-3-(2-sulpho-4-methylphenyl)-aminocarbonylaminoaniline | reddish-tinged orange |
| 72 | " | N,N-diethyl-3-(2-chloro-4-methyl-6-sulphophenyl)-aminocarbonylaminoaniline | " |
| 73 | " | N,N-diethyl-3-(4-sulphophenoxy)-methylcarbonylaminoaniline | " |
| 74 | " | N,N-diethyl-3-(2-chloro-4-sulphophenoxy)-methylcarbonylaminoaniline | " |
| 75 | 2-phenylsulphonyl-4-bromo-5-methylsulphonylaniline | N,N-diethyl-3-(2-chloro-4-sulphophenoxy)-methylcarbonylaminoaniline | bluish-tinged red |
| 76 | 2,5-bis-phenylsulphonyl-4-bromoaniline | N,N-diethyl-3-(2-methoxy-5-sulphophenyl)-carbonylaminoaniline | " |
| 77 | 2,5-bis-phenylsulphonyl-4-bromoaniline | N,N-diethyl-3-(3-sulpho-4-ethoxyphenyl)-carbonylaminoaniline | " |
| 78 | 2,5-dichloro-4-benzylsulphonylaniline | N,N-diethyl-3-(2-sulphophenyl)-carbonylaminoaniline | yellowish-tinged red |
| 79 | 2-phenylsulphonyl-5-benzylaminosulphonylaniline | N,N-diethyl-3-(2-sulphophenyl)-carbonylaminoaniline | scarlet |
| 80 | 2-(4-methylphenyl)-sulphonyl-4-chloro-5-benzylaminosulphenylaniline | N,N-diethyl-3-(2-sulphophenyl)-carbonylaminoaniline | yellowish-tinged red |
| 81 | 2-phenylsulphonyl-4-bromoaniline | N,N-diethyl-3-(x-sulpho-4-methylbenzyl)-carbonylaminoaniline | " |
| 82 | 2-ethylsulphonyl-5-trifluoromethylaniline | N,N-diethyl-3-sulphophenylethyl-carbonylaminoaniline | " |
| 83 | 2-phenylsulphonyl-4-bromo-5-phenylaminocarbonylaniline | N,N-diethyl-3-sulphophenylethyl-carbonylaminoaniline | bluish-tinged red |
| 84 | 2-trifluoromethyl-4-(N-phenylethyl-N-methylsulphonyl)-aniline | N,N-diethyl-3-(x-sulpho-4-methylphenylethyl)-carbonylaminoaniline | scarlet |
| 85 | 3-phenylsulphonyl-4-ethylaminocarbonylaniline | N,N-diethyl-3-(x-sulpho-4-methylphenylethyl)-carbonylaminoaniline | " |
| 86 | 3-methylaminosulphonyl-4-phenylsulphonylaniline | N,N-diethyl-3-(x-sulpho-4-methylphenylethyl)-carbonylaminoaniline | " |

TABLE 2-continued

| Example | Diazo component | Coupling component | Colour shade |
|---|---|---|---|
| 87 | 2,5-diethoxy-4-phenylamino-sulphonylaniline | N,N-diethyl-3-(x-sulpho-2-chloro-4-methoxyphenyl)-aminocarbonyl-amino | bluish-tinged red |
| 88 | 2-bromo-4-phenylaminocarbonyl-aniline | N,N-diethyl-3-(x-sulpho-2-chloro-4-methoxyphenyl)-aminocarbonyl-amino | scarlet |
| 89 | 2-bromo-4-phenylaminocarbonyl-aniline | N,N-diethyl-3-(4-sulphophenoxy)-methylcarbonylaminoaniline | " |
| 90 | 2-methyl-4-phenylamino-carbonylaniline | N,N-diethyl-3-(4-sulphophenoxy)-methylcarbonylaminoaniline | yellowish-tinged scarlet |
| 91 | 2-methyl-4-phenylamino-carbonylaniline | N-2-cyanoethyl-N-ethyl-3-(2-methyl-4-sulphophenoxy)-methyl-carbonylaminoaniline | " |
| 92 | 2-bromo-4-dimethylamino-sulphonylaniline | N-benzyl-N-ethyl-3-(4-sulpho-phenoxy)-ethylcarbonylamino-aniline | yellowish-tinged red |
| 93 | 2-phenylsulphonyl-5-methyl-sulphonylaniline | N-(2-acetoxyethyl)-N-ethyl-3-sulphophenylaminocarbonyloxy-methylcarbonylaminoaniline | " |
| 94 | 2,5-dichloro-4-methylamino-sulphonylaniline | N-(2-acetoxyethyl)-N-ethyl-3-sulphophenylaminocarbonyloxy-methylcarbonylaminoaniline | red |
| 95 | 2,4-dibromo-6-phenylsulphonyl-aniline | N-(methoxycarbonyloxyethyl)-N-ethyl-3-(2-sulphophenyl)-carbonyloxymethylcarbonyl-aminoaniline | " |
| 96 | 2,4-bis-phenylsulphonylaniline | N,N-diethyl-3-(x-sulphophenoxy)-carbonylaminoaniline | " |
| 97 | 2-trifluoromethyl-4-phenyl-sulphonylaniline | N,N-diethyl-3-(x-sulphophenoxy)-carbonylaminoaniline | scarlet |
| 98 | 2,5-dichloro-4-phenylethyl-aminosulphonylaniline | N,N-diethyl-3-(4-sulphophenoxy-sec.-butoxycarbonylaminoaniline | bluish-tinged red |
| 99 | 2-trifluoromethyl-4-(4-butoxy-butyl)-aminosulphonylaniline | N,N-diethyl-3-(x-sulphobenzyl)-aminocarbonylaminoaniline | yellowish-tinged red |
| 100 | 2,5-dichloro-4-tert.-butyl-aminosulphonylaniline | N,N-bis-(2-acetoxyethyl)-3-(2-sulphophenyl)-carbonylaminoaniline | scarlet |
| 101 | 2,6-dichloro-4-benzylamino-sulphonylaniline | N,N-diethyl-3-(x-sulpho-4-methyl-benzyl)-carbonylaminoaniline | red |
| 102 | 2-phenylaminocarbonyl-4-phenyl-aminosulphonylaniline | N,N-diethyl-3-(2-chloro-x-sulpho-5-methylphenyl)-ethylcarbonyl-aminoaniline | " |
| 103 | 2,5-dichloro-4-tert.-butyl-aminosulphonylaniline | N-[2-(2,4-dichloro-6-methyl-phenyl)-aminocarbonylaminoethyl]-N-ethyl-3-(4-sulphophenyl)-amino-carbonylaminoaniline | bluish-tinged red |
| 104 | 2,5-dichloro-4-tert.-butyl-aminosulphonylaniline | N-(2-ethylaminocarbonyloxyethyl)-N-ethyl-3-(4-sulphophenoxy)-methyl-carbonylaminoaniline | " |
| 105 | 3,5-bis-trifluoromethylaniline | N-(2-cyanoethyl)-N-phenylethyl-3-(4-sulphophenyl)-aminocarbonyl-aminoaniline | orange |
| 106 | 2-chloro-4-thiocyanoaniline | N,N-bis-(2-butoxyethyl)-3-(x-sulphophenoxy)-sec.-butyl-carbonylaminoaniline | " |
| 107 | 2,5-dichloro-4-(2-hydroxy-ethyl)-aminosulphonylaniline | N-ethyl-N-(2-chloroethyl)-3-(2-chloro-4-sulpho-5-ethoxyphenyl)-carbonylaminoaniline | bluish-tinged red |
| 108 | 2,5-dichloro-4-(4-cyanobutyl)-aminosulphonylaniline | N-(2-chloroethyl)-N-ethyl-3-(2,5-dimethyl-3-ethoxy-x-sulphophenyl)-carbonylaminoaniline | " |
| 109 | 2-trifluoromethyl-4-dimethyl-aminosulphonylaniline | N,N-diethyl-3-(x-sulpho-3-methoxy-phenyl)-carbonylaminoaniline | yellowish-tinged red |
| 110 | 2-trifluoromethyl-4-phenyl-ethylaminosulphonylaniline | N,N-diethyl-3-(3-sulpho-4-methoxy-phenyl)-carbonylaminoaniline | " |
| 111 | 2-trifluoromethyl-4-(3-chloro-4-methylphenyl)-aminosulphonyl-aniline | N,N-diethyl-3-(3-sulpho-4-methoxy-phenyl)-carbonylaminoaniline | " |
| 112 | 2-trifluoromethyl-4-diethyl-aminosulphonyl-5-chloroaniline | N,N-diethyl-3-(3-sulpho-4-methoxy-phenyl)-carbonylaminoaniline | bluish-tinged red |
| 113 | 2-trifluoromethyl-4-diethyl-aminosulphonyl-5-chloroaniline | N,N-diethyl-3-(4-sulphophenoxy)-methylcarbonylaminoaniline | " |
| 114 | 2,5-dichloro-4-benzyl-sulphonylaniline | N,N-diethyl-3-(2-sulpho-4-methyl-phenyl)-aminocarbonylaminoaniline | " |
| 115 | 2,5-dichloro-4-benzyl-sulphonylaniline | N,N-diethyl-3-(3-sulphophenyl)-aminocarbonylaminoaniline | " |
| 116 | 2,5-dichloro-4-diethylamino-sulphonylaniline | N,N-diethyl-3-(3-sulphophenyl)-aminocarbonylaminoaniline | " |
| 117 | 2,5-dichloro-4-diethylamino sulphonylaniline | N,N-diethyl-3-(4-sulphophenyl)-aminocarbonylaminoaniline | " |
| 118 | 2,5-dichloro-4-butoxypropyl-aminosulphonylaniline | N,N-diethyl-3-(4-methyl-x-sulpho-benzyl)-carbonylaminoaniline | yellowish-tinged red |

TABLE 2-continued

| Example | Diazo component | Coupling component | Colour shade |
|---|---|---|---|
| 119 | 4-cyclohexylmethylamino-sulphonyl-2,5-dichloro-aniline | N,N-diethyl-3-(4-methyl-x-sulpho- | " |
| 120 | 2,5-dichloro-4-hexylamino-sulphonylaniline | N,N-diethyl-3-(4-methyl-x-sulpho-benzyl)-carbonylaminoaniline | " |
| 121 | 2,5-dichloro-4-butoxypropyl-amino-sulphonylaniline | N,N-diethyl-3-(x-sulphobenzyl)-carbonylamino-aniline | " |
| 122 | 2,5-dichloro-4-N-methyl-N-cyclohexylaminosulphonyl-aniline | N,N-diethyl-3-(x-sulphobenzyl)-carbonylamino-aniline | " |
| 123 | 2,5-dichloro-4-phenethylamino-sulphonylaniline | N,N-diethyl-3-(x-sulphobenzyl)-carbonylamino-aniline | " |
| 124 | 4-cyclohexylaminosulphonyl-2,5-dicarbonaniline | N,N-diethyl-3-(x-sulphobenzyl)-carbonylamino-aniline | " |

We claim:
1. Water-soluble monoazo dyestuff which in the form of the free acid corresponds to the formula

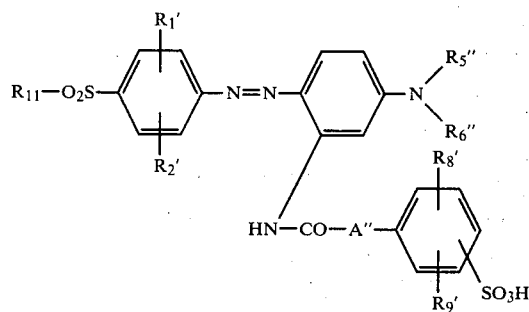

wherein
$R_8'$ and $R_9'$ denote hydrogen, chlorine, methyl, ethyl, methoxy, ethoxy, trifluoromethyl or cyano;
$A''$ denotes a direct bond, NH, $CH_2$—O, $CH_2$ or $C_2H_4$,
$R_1'$ denotes hydrogen, chlorine, bromine or trifluoromethyl,
$R_2'$ denotes hydrogen or chlorine,
$R_5''$ denotes methyl or ethyl,
$R_6''$ denotes methyl, ethyl or cyanoethyl, and
$R_{11}$ denotes benzyl, phenyl which is optionally substituted by chlorine or methyl, or a radical of the formula $$-N\begin{matrix}R_{12}\\R_{13}\end{matrix}$$

$R_{12}$ denotes hydrogen or $C_1$–$C_4$-alkyl and
$R_{13}$ denotes $C_1$–$C_{12}$-alkyl, $C_1$–$C_4$-alkoxy-$C_1$–$C_4$-alkyl, phenyl which is optionally substituted by methyl, ethyl, chlorine, methoxy or ethoxy, or benzyl, phenethyl, cyclohexyl or methylcyclohexyl.

2. Water-soluble monoazo dyestuffs according to claim 1, which, in the form of the free acid, correspond to the formula

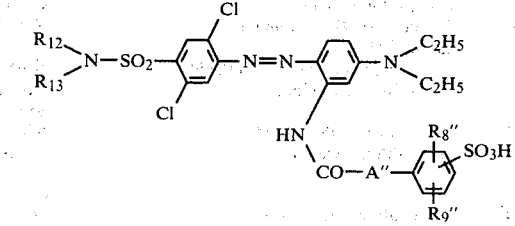

wherein
$A''$, $R_{12}$ and $R_{13}$ have the meaning given in claim 1,
$R_8''$ denotes hydrogen, chlorine, methoxy, ethoxy or methyl and
$R_9''$ denotes hydrogen, chlorine or methyl.

* * * * *

UNITED STATES PATENT AND TRADEMARK OFFICE
CERTIFICATE OF CORRECTION

PATENT NO. : 4,324,722
DATED : April 13, 1982
INVENTOR(S) : Dieter vor der Brück, et al It is certified that error appears in the above-identified patent and that said Letters Patent are hereby corrected as shown below:

Col. 4, line 24      last letters on bottom of formula, delete "$SO_2H$" and insert --$SO_3H$--

Col. 5, line 1      Last letters on bottom of formula, delete "$SO_2H$" and insert --$SO_3H$--.

Table 1, Ex. 16      Under "Substituents on B", delete "2-methyl-4-sulpho-5-sulpho" and insert --2-methyl-4-sulpho-5-chloro--.

Table 2, Col. 11, Ex. 119      Under "Coupling Component", second line was omitted: insert --benzyl)-carbonylaminoaniline--.

Signed and Sealed this

Twentieth Day of July 1982

[SEAL]

Attest:

GERALD J. MOSSINGHOFF

Attesting Officer      Commissioner of Patents and Trademarks